United States Patent [19]

Corbitt, III.

[11] Patent Number: 5,009,026
[45] Date of Patent: * Apr. 23, 1991

[54] FISH HOOK INCLUDING AN IMPROVED BAIT GUARD WITH A SLIDER

[76] Inventor: Newsome E. Corbitt, III., 3724 Beauclerc Rd., Jacksonville, Fla. 32217

[*] Notice: The portion of the term of this patent subsequent to Dec. 22, 2004 has been disclaimed.

[21] Appl. No.: 418,875

[22] Filed: Oct. 10, 1989

[51] Int. Cl.⁵ .............................................. A01K 83/06
[52] U.S. Cl. ..................................... 43/44.8; 43/44.2; 43/44.4
[58] Field of Search ................ 43/44.2, 44.4, 44.6, 43/44.8

[56] References Cited

U.S. PATENT DOCUMENTS

| | | | |
|---|---|---|---|
| 911,040 | 2/1909 | Hickey | 43/44.8 |
| 1,323,394 | 12/1919 | Jones | 43/44.8 |
| 1,766,279 | 6/1930 | Brown | 43/44.8 |
| 2,972,832 | 2/1961 | Anselmi | 43/44.8 |
| 2,982,049 | 5/1961 | Yost | 43/44.4 |
| 3,100,359 | 8/1963 | Laba | 43/44.8 |
| 3,465,466 | 9/1969 | Showalter | 43/44.8 |
| 4,713,908 | 12/1987 | Corbitt | 43/44.2 |

Primary Examiner—Richard K. Seidel
Assistant Examiner—Chuck Y. Mah
Attorney, Agent, or Firm—Berman, Aisenberg & Platt

[57] ABSTRACT

A bait-saving fish hook includes a rearward eye portion, a shank portion, and a forward hook portion together with a bait guard attached to the eye portion. The bait guard includes an elongated flexible member secured to the eye portion extending forwardly along at last one side of the shank portion, following the curve of the hook portion and extending rearwardly to and in engagement with the barbed point. The bait guard preferably returns correspondingly along the other side of the hook portion to be engaged with the eye portion of the fish hook. A slider can move from adjacent the eye portion to hold bait secured on the hook in place adjacent the barbed point.

17 Claims, 1 Drawing Sheet

FISH HOOK INCLUDING AN IMPROVED BAIT GUARD WITH A SLIDER

FIELD OF THE INVENTION

This invention relates to a fish hook including a bait guard of a basket type for securing bait on the fish hook.

BACKGROUND OF THE INVENTION

Fish hooks known in the art have not successfully solved the problem of keeping bait from falling off the hook. Prior art patents have used strand-type basket devices for a variety of purposes. Livermore, U.S. Pat. No. 51,951, shows a loop guard attached to the eyelet of a fish hook for engaging the hook point upwardly or downwardly in the mouth of the fish. Wentz, U.S. Pat. No. 2.608,791, and Kracht, U.S. Pat. No. 2,938,296, also show a guarded hook for engaging firmly in the mouth of the fish. Showalter, U.S. Pat. No. 3,465,466, shows a weed deflecting guard which closes the gap between eyelet and hook. Flowers, U.S. Pat. No. 4,229,001, shows a fish hook with an encircling holder into which live bait is inserted.

In my previous patent, U.S. Pat. No. 4,713,908, a bait guard is described in which the strands of the guard run substantially parallel to the curve of the fish hook, and the strands are engaged over the barbed point of the hook to hold the bait in place. The bait guard of U.S. Pat. No. 4,713,908 has been found to be less satisfactory than anticipated in holding bait of all types on a fish hook.

SUMMARY OF THE INVENTION

A wire basket or cradle is secured to the eye portion of the fish hook at one end and engaged on the barbed hook portion at its other end. The wire basket comprises either one strand or two strands. If one strand is used, it runs approximately parallel to the shank portion, spaced away from one side of the shank portion, following the curve of the hook to engage the barbed point in a notch or loop. If two strands are used, the two strands are disposed on either side of the shank portion, following the shape of the hook and joined in a v-shaped notch or loop which engages the barbed point. The improvement comprises a slider around the strands of the basket and the fish hook which slides from adjacent the eye portion toward the hook portion to hold the bait firmly in place on the hook.

It is an object of the invention to provide a fish hook having an improved bait guard which includes a slider for retaining the bait on the hook.

DETAILED DESCRIPTION OF THE INVENTION

Figure 1:
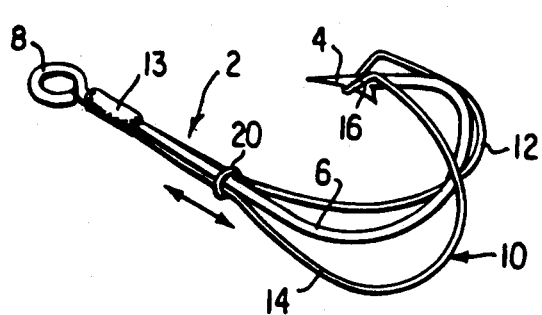
FIG. 1 is an perspective view of a fish hook having a basket and slider of the invention engaged on the barbed point.

It has now unexpectedly been found that adding a slider to the fish hook and bait guard of U.S. Pat. No. 4,713,908, holds the bait on the hook much more securely than according to the invention described therein. A slider which travels along a shank portion of the hook from adjacent the eye portion toward the hook portion may be used advantageously to hold the strand or strands of the bait guard close to the shank portion of the fish hook, enclosing the bait on the hook. The entire disclosure of U.S. Pat. No. 4,713,908 is incorporated herein by reference.

The bait-saving fish hook of the invention may have a one-strand wire basket bait guard or a two-strand wire basket bait guard attached. The fish hook may be a single hook or a treble hook, and may be used for any type of bait.

One end of the basket is wrapped around the eye of the fish hook or secured to the eye portion by solder. The other end of the basket is engaged on the tip of the barbed point a v-shaped notch or by a loop. A slider, which encircles the hook and strands of the basket, slides to adjacent the bait and keeps the bait from falling off the hook, making it harder for fish to steal the bait, as well as helping the fisherman to feel the bite of the fish. The bait-saving fish hook of the invention enables more fish to be caught as it is harder to get the bait off the hook, particularly since the slider holds the bait firmly on the barbed hook point portion. Thus, the fish must bite harder at the bait and the fisherman feels the bite more easily.

Referring now to FIGS. 1-6 in which like numerals represent like parts, fish hook 2 has a barbed point 4 connected to shank portion 6. At the other end of shank portion 6 is eye portion 8, shown as a closed eyelet. Basket 10, which is preferably of wire, comprises at least one strand 12 secured to eye portion 8 at one end, by a bead of solder 13 or by other appropriate means, spaced apart from one side of the shank portion 6 and approximately the same length as and parallel to shank portion 6, strand 12, forming a v-shaped notch 16 engaging barbed point 4. The strand continues, spaced apart from the other side of shank portion 6, as strand 14 which extends from v-shaped notch 16 to the eyelet portion 8 in a similar manner to strand 12, approximately the same length as and parallel to shank portion 6. Slider 20 is a wire ring or a ring made of plastic filament, or other material known to one skilled in the art, which may be moved along shank portion 6 as shown by the arrow in FIG 1.

Figure 2:
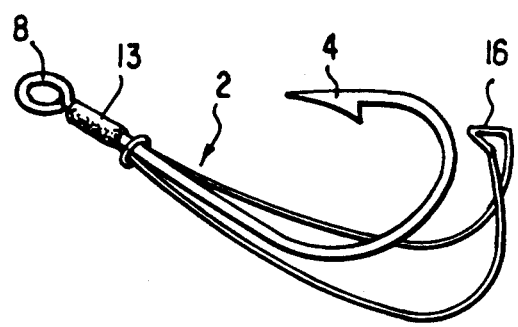
FIG. 2 is a perspective view of a fish hook of FIG. 1 having the basket disengaged from the barbed point.
Figure 3:
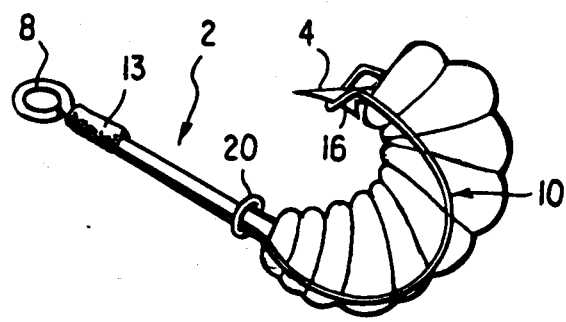
FIG. 3 is a perspective view of a fish hook of FIG. 1 showing bait secured with the slider.

Slider 20 is located adjacent eye portion 8 while the bait guard is off the hook, as shown in FIG. 2, such as when bait is put on the hook. After bait has been put on the hook, notch 16 is engaged over barbed point 4 and slider 20 is pushed along the hook toward the barbed point, to hold the bait firmly in position, as shown in FIG. 3. Thus, bait is held securely between slider 20, bait guard 10 and barbed point 4.

Figure 4:
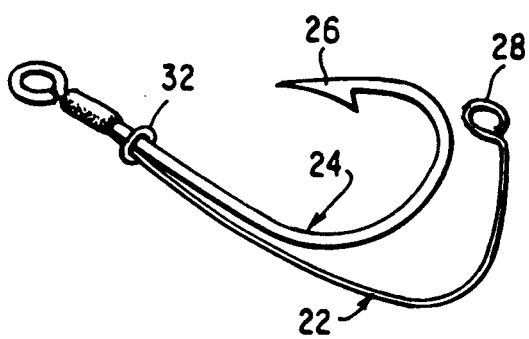
FIG. 4 is a perspective view of a fish hook including a single strand basket disengaged from the hook and a slider of the invention.
Figure 5:
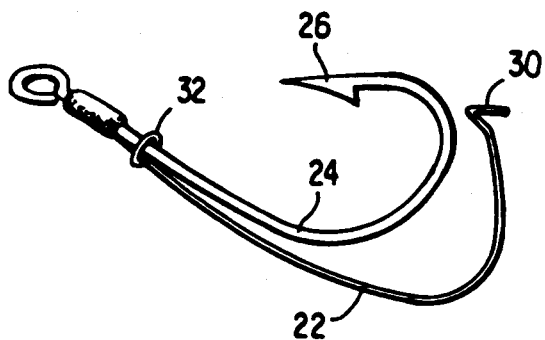
FIG. 5 is a perspective view of a fish hook of FIG. 4 having another embodiment of basket disengaged from the barbed point.

A single strand basket 22 is shown in FIG. 4, engaged on fish hook 24 similarly to the basket shown in FIGS. 1 to 3. The single strand basket is engaged on barbed point 26 by loop 28. FIG. 5 shows an embodiment similar to that of FIG. 4 in which loop 28 is replaced by notch 30 which may be engaged on barbed point 26, similarly to the engagement of notch 16 on barbed point 4, shown in FIGS. 1 to 3. Slider 32 of FIGS. 4 and 5 functions similarly to slider 20 of FIGS. 1 to 3.

Figure 6:
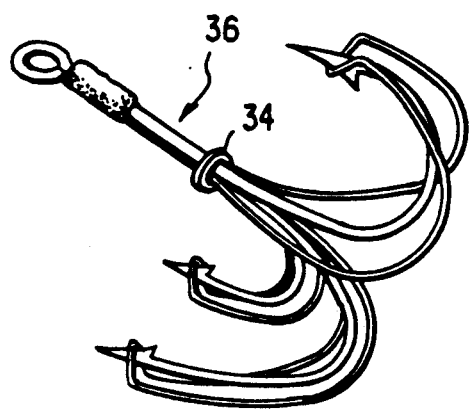
FIG. 6 is a perspective view of a treble fish hook including baskets on each hook and a slider of the invention.

FIG. 6 shows slider 34 engaged on treble hook 36 similarly to the slider engagement in FIGS. 1 to 5.

The slider may be a wrapped loop of wire or other suitable flexible material, as illustrated by slider 34 of FIG. 6 or may be a soldered or adhesively secured loop, as illustrated by sliders 20 and 32 in FIGS. 1 to 5.

In use, the wire basket is removed form the barbed point, as shown in FIG. 2, the bait is fastened to barbed point 4, v-shaped notch 16 of basket 10 is engaged on barbed point 4, and slider 20 is pushed securely to firmly hold the bait adjacent to the barbed point, as shown in FIG. 3. The hook is cast into the water in the usual manner.

The strands of the basket are elongated flexible members, and may be strands of wire, plastic coated wire, plastic filament or other appropriate material. The strands may be flat-surfaced, elongated flexible members, or may be any elongated flexible members suitable for the purpose.

A slider of the invention may equally well be used whether the bait guard is a double strand bait guard, as illustrated in FIG. 1 to 3, or a single strand bait guard, as illustrated in FIGS. 4 and 5, or a treble bait guard, as illustrated in FIG. 6, or other similar variation. A treble hook may alternatively have a slider for each hook. The eye portion may be an open eye or a closed eye. The basket may be attached to the fish hook by wrapping, by winding the strands through the eye or around a portion of the hook adjacent the eye, adhesively, by solder or by other means known in the art. The basket may be wrapped on the eye portion of the fish hook by means of thread 18, such as thread of wire, plastic, linen or other appropriate material. Each strand may also be soldered, secured ashesively to the fish hook, or fastened by other equivalent means. Further, the bait guard of the invention may be used on a hook together with a skirt, weed guard, or other device commonly found in association with fish hooks.

While the invention has been described above with respect to certain embodiments thereof, it will be appreciated that variations and modifications may be made without departing from the spirit and scope of the invention.

What is claimed is:

1. A fish hook including a bait guard, said fish hook comprising a rearward eye portion, an intermediate shank portion, and a forward hook portion, said bait guard comprising means for keeping bait on the hook, comprising:

an elongated flexible member secured to the eye portion, extending forwardly along a side of the shank portion, following the curve of the hook portion and extending rearwardly to and in releasable engagement with a barbed point on the end of the hook portion, and means for sliding encircling the flexible member and the shank portion of the fish hook movable along the hook between the eye portion and the hook portion, whereby said sliding means is positioned adjacent bait held on the hook to secure said bait on the hook.

2. A bait guard of claim 1, wherein the elongated flexible member in releasable engagement with the barbed point on the end of the hook portion, then follows the other side of the fish hook along the curve of the hook portion, rearwardly along the shank portion, and into securement with the eye portion.

3. A bait guard of claim 2 wherein the sliding means comprises an elongated member forming a closed loop.

4. A bait guard of claim 2 wherein the sliding means comprises an elongated member forming a wrapped loop.

5. A bait guard of claim 2 wherein the flexible member is a continuous strand releasably engaging the barbed point in a notch in the strand.

6. A bait guard of claim 1 wherein the sliding means comprises an elongated member forming a closed loop.

7. A bait guard of claim 1 wherein the sliding means comprises an elongated member forming a wrapped loop.

8. A bait guard of claim 1 wherein the flexible member is a continuous strand releasably engaging the barbed point in a notch in the strand.

9. A bait guard of claim 1 wherein the flexible member is a continuous strand releasably engaging the barbed point in a loop in the strand.

10. A bait guard of claim 1 wherein the flexible member is a wire strand.

11. A bait guard of claim 1 wherein the flexible member is a plastic-covered wire strand.

12. A bait guard of claim 1 wherein the flexible member is a plastic strand.

13. A bait guard of claim 1 wherein the flexible member is adhesively secured to the eye portion.

14. A bait guard of claim 1 wherein the flexible member is soldered to the eye portion.

15. A bait guard of claim 1 wherein the flexible member is secured to the eye portion by wrapping.

16. A bait guard of claim 1 wherein said fish hook comprises a multiple hook portion including a bait guard on at least one hook.

17. A bait guard claim 16 wherein said fish hook comprises a bait guard on each hook.

* * * * *